(12) United States Patent
Schmidt

(10) Patent No.: US 8,347,669 B2
(45) Date of Patent: Jan. 8, 2013

(54) SECURING MECHANISM COOPERATING WITH A DEVICE THAT IS TO BE SECURED

(75) Inventor: Reinhold Schmidt, Gundelfingen (DE)

(73) Assignee: Invictus AG Innovation & Engineering, Huefingen-Behla (DE)

( * ) Notice: Subject to any disclaimer, the term of this patent is extended or adjusted under 35 U.S.C. 154(b) by 1070 days.

(21) Appl. No.: 11/817,729

(22) PCT Filed: Mar. 1, 2006

(86) PCT No.: PCT/EP2006/001860
§ 371 (c)(1),
(2), (4) Date: Sep. 22, 2008

(87) PCT Pub. No.: WO2006/092284
PCT Pub. Date: Sep. 8, 2006

(65) Prior Publication Data
US 2009/0013735 A1     Jan. 15, 2009

(30) Foreign Application Priority Data
Mar. 4, 2005   (DE) .......................... 10 2005 010 483

(51) Int. Cl.
*B65D 55/14*   (2006.01)
*F16B 41/00*   (2006.01)

(52) U.S. Cl. ................. 70/165; 70/169; 70/173; 70/232; 70/307; 70/308; 70/327; 70/DIG. 57; 411/910

(58) Field of Classification Search ............ 70/158–173, 70/229–232, 304–307, 327, 328, 333 A, DIG. 57; 411/910; 220/210, 315
See application file for complete search history.

(56) References Cited

U.S. PATENT DOCUMENTS

| 572,633 | A | * | 12/1896 | Gray ................................ 70/287 |
| 573,136 | A | * | 12/1896 | Cable .............................. 70/304 |
| 887,591 | A | * | 5/1908 | Cook ............................ 137/371 |
| 1,166,970 | A | * | 1/1916 | Clark .............................. 70/304 |
| 1,877,545 | A | * | 9/1932 | Wise .............................. 70/232 |
| 3,670,535 | A | * | 6/1972 | Stettner et al. .................... 70/58 |
| 3,731,505 | A | * | 5/1973 | Rosenberg et al. ............... 70/63 |
| 3,796,074 | A | * | 3/1974 | Vik ................................ 70/231 |
| 4,014,193 | A |   | 3/1977 | Carter |
| 4,288,902 | A | * | 9/1981 | Franz .......................... 29/407.1 |
| 4,354,367 | A | * | 10/1982 | Wahl ........................ 70/333 A |

(Continued)

FOREIGN PATENT DOCUMENTS

DE         496692 C      4/1930

(Continued)

*Primary Examiner* — Lloyd Gall
(74) *Attorney, Agent, or Firm* — Browdy and Neimark, P.L.L.C.

(57) ABSTRACT

A securing mechanism cooperating with a device that is to be secured, having a closing part, which can be slipped onto a free end region of the device. Locking elements are rotatably mounted in the closing part and engage into an annular groove of the device by an engaging element to lock it, except in one defined position of rotation. An adjusting member engages in an end region of the locking elements accessible from outside. A spring presses the locking element against a contact area of the closing part in the direction of the axis of rotation thereof forming a brake. A catching structure provided with a plurality of catching points is disposed on an annular surface of the locking elements. A catching element engages into the catching points when the respective locking element is rotated, at least when the closing part is tilted.

6 Claims, 4 Drawing Sheets

U.S. PATENT DOCUMENTS

| | | | | |
|---|---|---|---|---|
| 4,735,067 A | * | 4/1988 | Tawil | 70/312 |
| 4,848,112 A | * | 7/1989 | Graber et al. | 70/231 |
| 4,964,773 A | | 10/1990 | Schmidt | |
| 5,005,723 A | * | 4/1991 | Smallfoot | 220/210 |
| 5,211,040 A | | 5/1993 | Gisiger | |
| 5,469,726 A | * | 11/1995 | Rushing et al. | 70/232 |
| 5,881,588 A | * | 3/1999 | Schmidt | 70/213 |

FOREIGN PATENT DOCUMENTS

| | | |
|---|---|---|
| DE | 20 2004 017 548 U1 | 1/2005 |
| EP | 0360125 A | 3/1990 |
| EP | 0867583 A2 | 9/1998 |
| EP | 10162108 A1 | 7/2003 |
| FR | 542068 A | 8/1922 |

* cited by examiner

SECURING MECHANISM COOPERATING WITH A DEVICE THAT IS TO BE SECURED

FIELD OF THE INVENTION

The invention relates to a securing mechanism cooperating with a device that is to be secured, having a closing part, which can be plugged into a bore of the device that is to be secured, or slipped onto a free end region of the device that is to be secured, and in which at least two locking elements are rotatably mounted and engage into an annular groove of the device that is to be secured by means of an engaging element in order to lock the same except in one defined position of rotation, wherein an end region of the locking elements that is accessible from outside is implemented in each case so as to allow an adjusting member to engage therein.

BACKGROUND OF THE INVENTION

In a securing mechanism of this type that is known from EP 0360125 B1, the device that is to be secured is implemented in the form of a bolt, especially as a lug bolt for motor vehicle wheels. In the secured state the locking element is rotatably mounted on the free end region of the bolt and prevents access to the same in order to prevent any unauthorized loosening thereof. Only when all locking elements are moved into their respective defined position of rotation in which they move out of engagement with the annular groove of the end region of the bolt can the closing part be pulled off, and the now exposed head portion of the bolt can be turned by means of a suitable tool for unscrewing the bolt.

The shortcoming of the known securing mechanism lies in that, depending on the technical production precision of the securing mechanism, it is possible to sense, through tilting of the closing part and simultaneous rotating of a locking element, its defined position of rotation in which it moves out of engagement with the annular groove. This can be sensed by a slight jerk, especially in cases of imprecise fabrication. In this manner all locking elements can be moved into their defined coded position of rotation, one after another, to pull off the closing part.

SUMMARY OF THE INVENTION

It is the object of the present invention to improve the prior-art securing mechanism in such a way that it is no longer possible to sense the locking positions of the locking elements even with forceful tilting and poor manufacturing tolerances.

This object is met according to the invention in such a way that each locking element has an associated spring that presses it in the direction of its axis of rotation against a contact area of the closing part, and that a catching structure having a plurality of catching points is disposed on an annular surface of the locking elements or of the closing part, a catching element being provided on the opposite side in an axial direction, which engages into catching points of the catching structure when the respective locking element is rotated, at least during a tilting or axial displacement of the locking element.

The advantage of the inventive securing mechanism particularly lies in that it is no longer possible, because of the catching structure, to sense the unlocking positions of the locking elements, either through tilting of the closing part or by any other means, so that the catching element engages into the individual catching positions either by tilting or by spring force, and one therefore cannot distinguish which catching point corresponds to the unlocking position, as the catching element jumps from catching point to catching point with each rotation of a locking element. This provides a very high degree of protection against unauthorized removal of the closing part, so that the device that is to be secured and that is provided with the closing part prevents any unauthorized access. Moreover, the prior-art advantages of this solution continue to exist and exist in addition, which means that a far-reaching protection against mechanical damage is achieved and, since all locking elements must be moved into certain positions to lock them, identifying the locking positions is nearly impossible, especially if a large number of locking elements exists.

The measures listed in the subclaims permit advantageous further developments and improvements of the securing mechanism.

In a preferred embodiment the locking elements are implemented in the form of rotatably mounted pins, which are provided in each case with the disc-shaped concentric engaging element for engagement into the annular groove of the device that is to be secured, the engaging element having a peripheral recess through which an engagement into the annular groove is prevented in this position of rotation. Depending on the design of the device that is to be secured, the engagement into this annular groove may take place in a radially outward or radially inward direction.

In a first preferred embodiment, the engaging element is pressed spring-biased by the spring that acts upon a locking element in each case against the contact area of the locking element that is designed as an annular surface, the annular surface of the engaging element that faces the contact area being provided with the catching structure, and an edge of the annular groove of the device that is to be secured situated opposite this annular surface serving as the catching element that engages into one of the correspondingly shaped catching points of the catching structure when the closing part is tilted or displaced (pulled or pushed) in the axial direction. It is optionally possible in this context to have the catching engagement occur only during a tilting or pulling movement, so that no catching takes place in the untilted or force-free state, or alternatively, the catching structure must be placed for connection to the opposite edge of the annular groove in such a way that a jump from catching point to catching point takes place in each case when the locking elements are rotated.

In a second advantageous embodiment of the invention, first the engaging element is again pressed spring-biased by the spring that acts upon a locking element in each case against the contact area of the closing element that is designed as an annular surface, and this contact area or the annular surface of the engaging element facing this contact area is now provided with the catching structure, while the respective other surface is provided with the catching element that engages into this catching structure. In this embodiment the respective catching element jumps from catching point to catching point of the catching structure when the locking element is rotated, so that it is not possible to sense the location of the unlocking position of the locking elements. The catching structure in this case is advantageously designed in the form of a toothing.

In a third advantageous embodiment, the catching element, which is designed particularly in the form of a ball element, is pressed spring-biased by the spring against the annular surface of the respective locking element in each case, the annular surface being provided with the appropriately shaped catching structure. In this embodiment, too, the spring-biased catching element jumps from catching point to catching point in each case when the locking elements are rotated, thus preventing a sensing of the unlocking positions.

The force of the spring and the catching structure are advantageously designed and cooperate in such a way that the catching element jumps from catching point to catching point when the locking element is rotated, i.e., it does not catch in such a way that a continued rotation is prevented.

The adjusting member, which may be designed as a rotation adjusting member, for example, is advantageously provided with an adjusting dial so that, for example, in the case of four locking elements, a four-digit number is specified as the unlocking code, which must be remembered, and this number can then be set via the adjusting member.

No adjusting dial needs to be provided if the catching structure is provided with one altered catching position in one area for a reference point sensing. The altered catching point can be sensed through rotation, and the rotation must then be continued from this reference point in each case by the coded number of catching points to unlock the device.

The adjusting member or some other auxiliary instrument is advantageously connectable to the closing part in a manner so that it cannot be pulled off, particularly by means of a thread-type or bayonet-type connection, so as to be able to pull off the closing part more easily after unlocking. This is important especially in the case of a closing part that is inserted into an opening.

The closing part advantageously consists of at least two axially joinable, especially screw-connectable individual elements, each of which has support points for the locking elements. This permits a particularly simple and quick mounting of the closing part. To protect against dirtying, for example in the case of an application in lug bolts of a motor vehicle wheel, the face of the closing part that is provided with the access points to the end regions of the locking elements is advantageously provided with a removable cap.

Exemplary embodiments of the invention are shown in the drawing and will be explained in more detail in the description that follows. In the drawing FIG. 1 shows a sectional view of a first exemplary embodiment of the invention along the section line A-A in FIG. 3, FIG. 2 shows a perspective oblique view of the first exemplary embodiment with the upper region of the closing part removed.

DETAILED DESCRIPTION OF THE INVENTION

Figure 1:
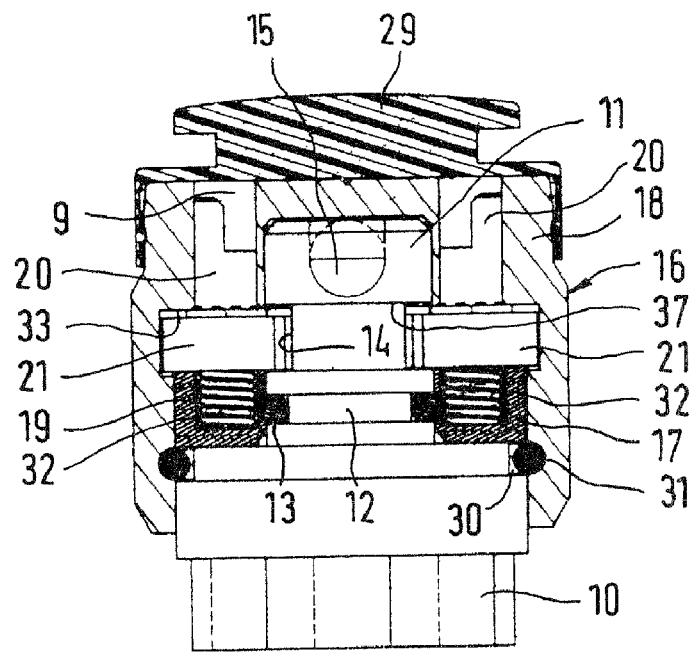
Figure 2:
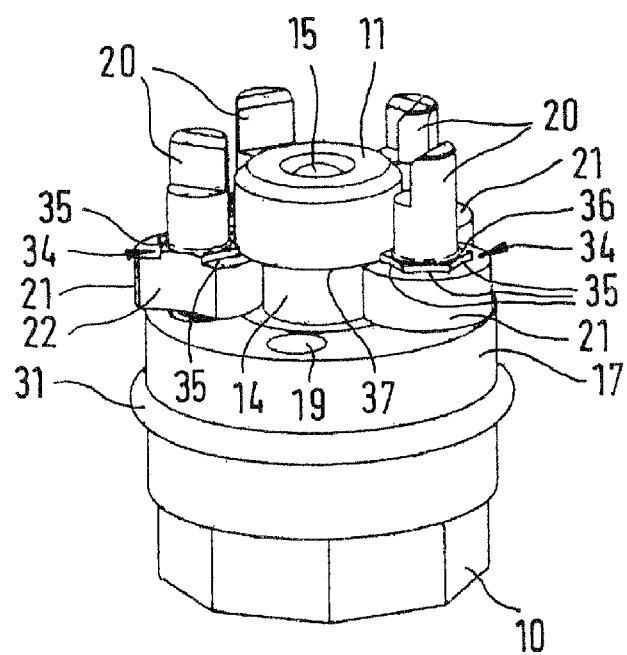
Figure 3:
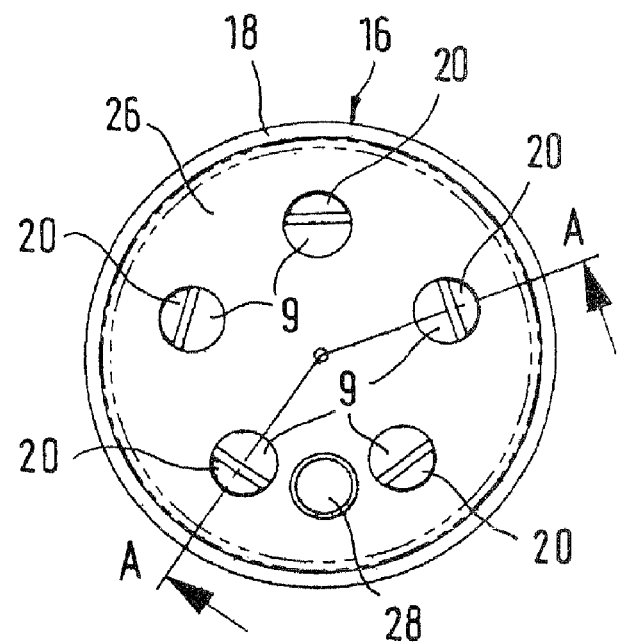
FIG. 3 shows a top view of the upper face of the first exemplary embodiment.

In the first exemplary embodiment shown in FIGS. 1 through 3, a device 10 that is to be secured is a rod-like or cylinder-like part, of which only an end region is shown. It may be a bolt, a nut, a bicycle axle, part of a shackle-type connector, or the like. At the end being secured of this device, an integral cylindrical extension 11 is provided concentrically, for example molded on in one piece, which has a smaller diameter and a smaller annular groove 12 for accommodating an annular seal 13 that also serves as a brake during the rotation and during a pulling movement, and a larger annular groove 14 that serves as an annular locking groove and whose function will be explained in more detail further below. This cylindrical extension 11 has a hardened steel ball 15 concentrically pressed-in at its end, which serves to prevent the assembly from being drilled open.

In the case of an embodiment in the form of a bolt, the cylindrical extension 11 is designed as a point of application for a tool and has, for example, a hexagon socket or hexagon head or other tool-receiving socket. Access to the extension 11 that is designed as the point of application for the tool shall be prevented in order to, for example, prevent a theft, an opening or a moving of the part that is secured by this bolt. The same applies to the implementation in the form of a nut. In the case of an implementation in the form of a bicycle axle, shackle-type connector, or the like, the goal is to prevent the respective part from being removed from its holder or support.

A closing part 16 that can be slipped onto the cylindrical extension 11 or onto the device 10 that is to be secured consists of an annular base part 17 and cup-shaped top part 18, which are screwed, locked (for example by means of snap rings), soldered, welded, or glued together in a manner that is not shown. The cup-shaped top part 18 extends over the annular base part 17 and additionally also extends over an end region of the device 10 that is to be secured, in order to reliably prevent access to the same.

The annular base part 17 has five blind bores 19 distributed over its circumference that serve as support points for one end region of five locking elements 20 in each case, wherein the opposed end regions of these locking elements 20 are rotatably mounted in the through-bores 9 of the cup-shaped top part 18.

The locking elements 20, which are otherwise round-rod shaped, have approximately centrically disposed disc-shaped engaging elements 21 in each case, which are formed onto the locking elements 20 in one piece or are permanently connected to the same. They serve for the securing engagement into the larger annular groove 14 of the device 10. These engaging elements 21 each have a recess 22 in one area on the outer circumference that is matched to the radius of the cylindrical extension 11 in such a way that the engaging elements 21 move out of engagement with the annular groove 14, i.e., into an unlocking position, in a position in which this recess 22 is oriented radially inward. If all five locking elements 20 are rotated into the unlocking position, the closing part 16 can be pulled off the device 10.

Figure 4:
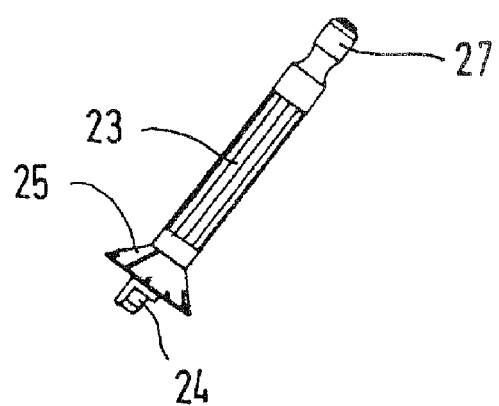
FIG. 4 shows an adjusting member provided with an adjusting dial, for setting of a code.

For adjusting the locking elements 20, the adjusting member 23 is provided, which is designed as a rotation adjusting member and shown in FIG. 4. It has an insertion end 24 of semi-circular cross section, which, when it is inserted into one of the through-bores 9, comes into engagement with the upper end region of the respective locking element 20 in each case, which also has a semi-circular cross section. In lieu of the semi-circular cross section, other intermeshing cross-sections that permit a turning of the locking elements may, of course, be provided instead. The adjusting member 23 has an adjusting dial 25 whereby the respective unlocking position can be set. To this effect, the upper face 26 of the cup-shaped top part 18 has, around the openings of the through-bores 19, either dials or at least a zero mark, which in the exemplary embodiment of FIG. 3 is implemented in the form of a center bore. The opposite end of the adjusting member 23 is provided with a thread 27, which can be screwed into the threaded blind bore 28 of the cup-shaped top part 18. This serves as a pull-off aid for the top part 18. In lieu of a thread, some other known locking means may be provided instead, of course, such as a bayonet-type or snap-in locking means.

To protect against dirtying, for example in an application as a lug bolt of a vehicle wheel, the cup-shaped top part 18 is covered on top in a sealing manner with a plastic cap 29. At the opposite free end region of the tube-like wall of the cup-like top part 18, which slightly extends over the device 10 that is to be secured, an annular groove 30 is provided on the inside for accommodating a snap ring 31. It serves for mounting the closing part 16. In place of a snap ring, other suitable securing elements may be used instead, e.g., Seeger circlip rings.

Helical springs 32 in the blind bores 19 press the locking elements 20 upward, so that the engaging elements 21 rest against a contact area 33 in the form of an annular surface of the top part 18 through the force of these helical springs 32 and slide along this contact area 33 when the locking elements 20 are rotated, thereby acting as a brake. The upper annular surface of the engaging elements 21 that faces the contact area 33 is provided with a catching structure 34. It consists of a series of recesses serving as catching points 35, whose surface area corresponds to the recess 22, but which are only a few tenths of a millimeter deep, in other words, each of the catching points or recesses 35 has a surface similar in contour to the recess 22. The contact area 33, in the process, slides along the radially inwardly remaining region 36 to which the catching points 35 adjoin toward the outside. If one attempts to sense the position of the recess 22 that effects the unlocking by tilting the cup-shaped top part 18 relative to the device 10 that is to be secured, i.e., if one exerts a torque relative to the axis of rotation, the upper edge of the annular groove 14 that acts as a catching element 37 in this case moves into engagement with one of the catching points 35. During continued rotation, this edge therefore catches from catching point 35 to catching point 35 and it is not possible to distinguish these catching points 35 from the recess 22. This has the result that the recess 22 de facto cannot be sensed.

Figure 5:
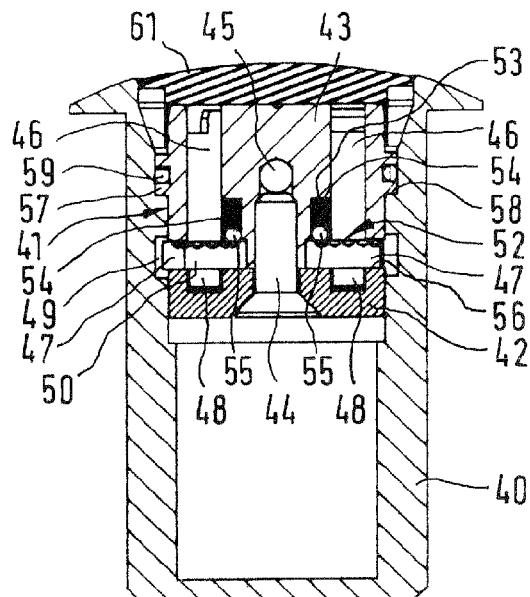
FIG. 5 shows a sectional view of a second exemplary embodiment of the invention along the section line B-B in FIG. 7.
Figure 6:
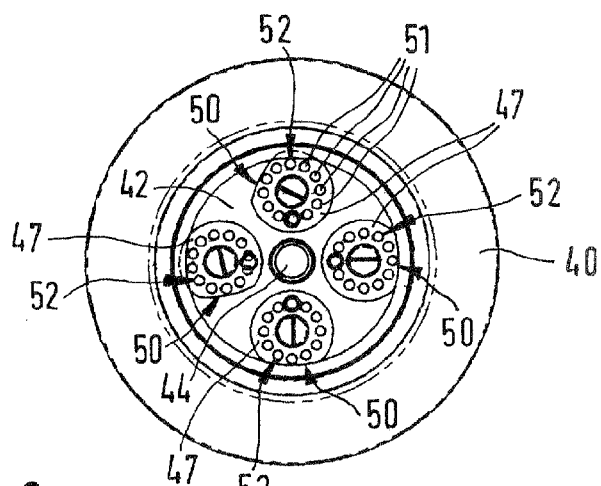
FIG. 6 shows a top view of the second exemplary embodiment shown in FIG. 5 with the upper region of the closing part removed.
Figure 7:
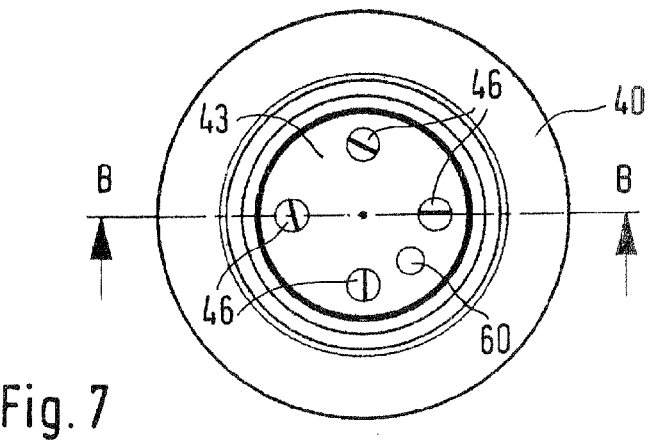
FIG. 7 shows a top view of the upper face of the second exemplary embodiment shown in FIGS. 5 and 6.

In the second exemplary embodiment depicted in FIGS. 5 through 7, a device 40 that is to be secured is implemented in the form of a so-called mini safe in tubular shape with a closed bottom. A closing part 41, which again consists of two parts, is provided for closing of the upper opening in FIG. 5 of the device 40 and again consists of a disc-shaped base part 42 and cylindrical top part 43. The base part 42 and top part 43 are screwed together with a securing screw 44. Disposed at the bottom of the threaded bore that is provided in the top part 43 for the securing screw 44 once again is a steel ball 45 that is placed there to prevent an opening by drilling.

In the same manner as in the first exemplary embodiment, four locking elements 46 that are provided with engaging elements 47 are again rotatably mounted between the base part 42 and top part 43. The locking elements 46, which are again supported in blind bores 48 of the base part 42 do not have any helical springs there, as opposed to the first exemplary embodiment. When the locking elements 46 are rotated, they engage radially outward into a circumferential groove 49 on the inside of the tubular device 40 for locking of the locking element 41. As can be see from FIG. 6, the engaging elements 47 each have a flattened area 50 in one area. This flattened area is designed in such a way that an unlocking takes place when all flattened areas 50 face radially outward. The engaging elements 47 then move out of engagement with the circumferential groove 49.

At the annular surface of the engaging elements 47 that is oriented toward the opening to be closed of the device 40, indentations 51 are distributed along the circumference, forming catching structures 52. In blind bores 53 that are provided in the top part 43 and extend parallel to the longitudinal direction, helical springs 54 are disposed, each of which presses a catching ball 55 against the engaging elements 47 in such a way that when a locking element 46 is rotated, the respective locking ball 55 jumps from indentation 51 to indentation 51. This prevents, like in the first exemplary embodiment, that the unlocking positions can be sensed.

By means of the helical springs 54 the engaging elements 47 are pressed via the catching balls 55 against the base part 42, which thus forms a sliding contact area 56 for the engaging elements 47 and thus for the locking elements 46.

To limit the insertion depth of the closing part 41 into the interior of the device 40, the top part 43 has an annular end stop 57 toward the outside, with a counter-end-stop 58 on the inside wall of the device 40 limiting the insertion movement. The annular end stop 57 is provided with an annular seal 57, which forms a seal toward the inner surface of the device 40.

The unlocking process, i.e., finding the unlocking positions of the locking elements 46, can again take place analogous to the first exemplary embodiment with the adjusting member 23 shown in FIG. 4. A threaded blind bore 60 at the outer face of the top part 43 again serves for pulling out the unlocked closing part. Into this threaded blind bore 60 the adjusting member 23 can be screwed.

It is also possible to perform the unlocking without an adjusting dial 25 and without looking at the closing part 41. To achieve this, the catching structure 52 needs to have an elongated hole in one area instead of one or more indentations 51, which can be felt by rotating the adjusting member 23. This elongated hole serves as a reference position, starting from which a specifiable number of catching movements leads to the unlocking position in each case.

In the second exemplary embodiment, too, a plastic cap 61 or protective cap made of some other material again serves to cover the closing part 41.

Figure 8:
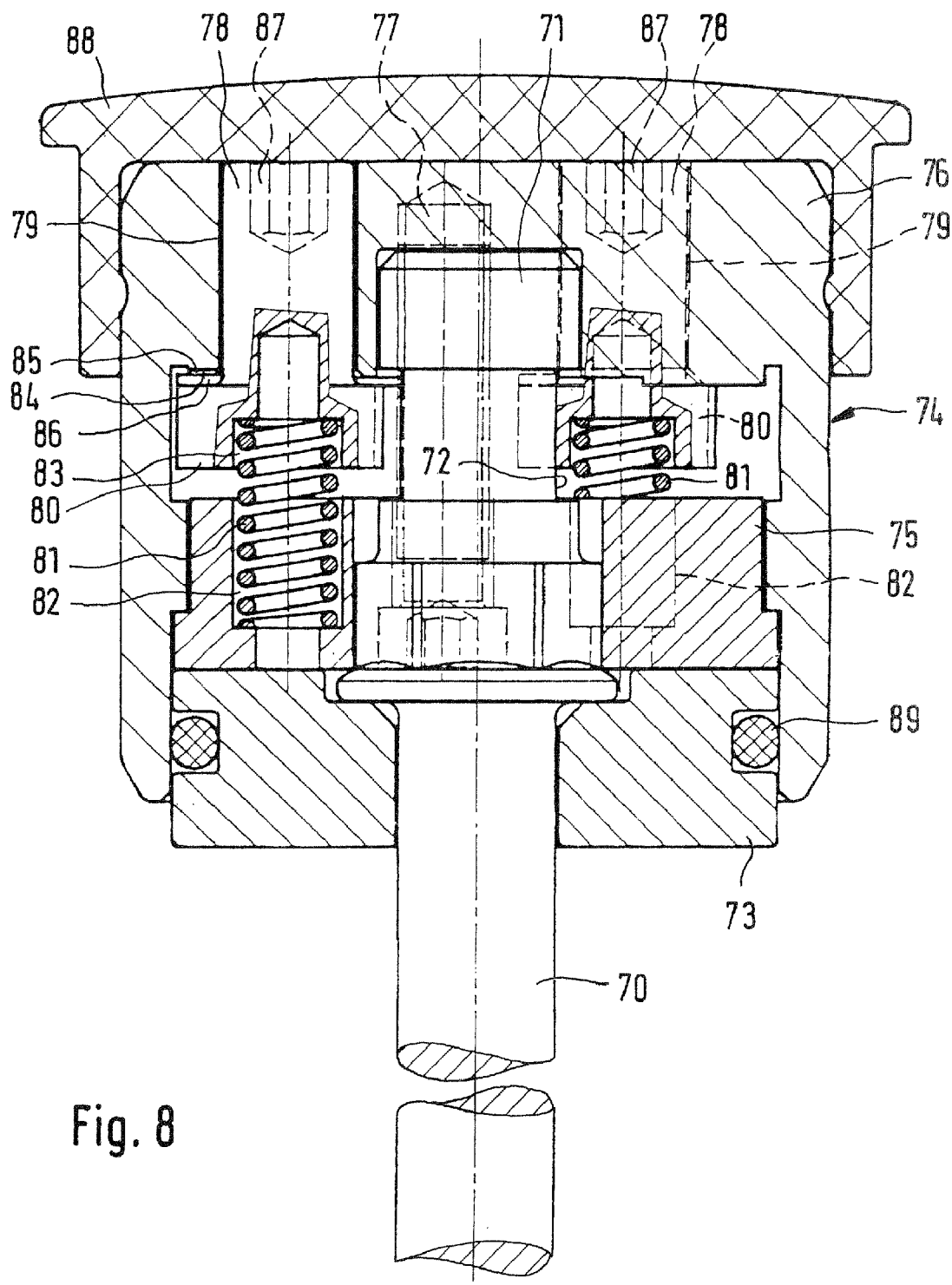
FIG. 8 shows a sectional view of a third exemplary embodiment of the invention.

In the third exemplary embodiment shown in FIG. 8, a device 70 that is to be secured is implemented in the form of a shaft or axle, for example a bicycle axle. Like in the first exemplary embodiment, this device 70 in the form of a shaft has a cylindrical extension 71 that is provided with an annular groove 79. In individual cases the cylindrical extension 71 may also be implemented as an application point for a tool. Additionally a ring-wheel shaped element 73 is permanently connected to the end region of the device 70, for example by welding, soldering, glueing or clamping, in such a way that the cylindrical extension 71 protrudes beyond this ring-wheel shaped element 73.

The closing part 74 is designed similar to the closing part of the first exemplary embodiment and serves for covering the cylindrical extension 71. It consists of a ring-wheel shaped base part 75 and cup-shaped top part 76, which are screwed together by means of a securing screw 77.

Five locking elements 78 are rotatably mounted with their shaft-like regions in through-bores 79 of the top part 76 and once again have disc-like engaging elements 80. Helical springs 81 are supported in bores 82 of the base part 75 and open into blind bores 83 of the engaging elements 80. This causes the engaging elements 80 to be elastically pressed against an annular surface 84 of the top part 76 that encompasses the locking elements 78. This annular surface 84 is provided with a toothing 85 and the annular surface of the engaging elements 80 that is situated opposite this toothing 85 is provided with a locking tooth 86. When the locking element 78 is rotated, the locking tooth 86 thus jumps in each case from tooth to tooth of the toothing 85 that serves as the catching structure. In a function corresponding to the second exemplary embodiment, this prevents the unlocking position from being sensed when the locking elements 78 are rotated. The shape of the engaging elements 80 in this case corresponds to the shape of the engaging elements 21 of the first exemplary embodiment, with the unlocking recesses not being visible in the sectional view of FIG. 8.

To provide for a rotation of the locking elements 78, hexagon sockets 87 are provided at the free upper end of these locking elements 78. The rotation can thus be performed with a hexagon wrench. To permit a reference position to be recognized, the toothing 85 that serves as the catching structure has a gap or a wider tooth, which can be sensed during the rotation. Starting with this reference position, the rotation then needs to be continued by a specified number of tooth catchings until the unlocking position is reached. It is also possible, of course, to design the upper end of the locking elements 78 analogous to the previous exemplary embodiments and to use an adjusting member 23. In the case of a continuous toothing 85, the setting then needs to take place by means of the adjusting dial 25. It is also possible, on the other hand, to carry out the rotation of the locking elements of the previous exemplary embodiments like in the third exemplary embodiment.

Provided for the top sealing of the closing part 74, again, is a cap 88, which may consist, for example, of a sealing plastic material. Provided for the bottom sealing is an annular seal 89 at the ring-wheel shaped element 73 of the device 70, which is overlapped by the free tubular end of the top part 76, thereby effecting the seal.

In the first exemplary embodiment the base part of the closing part is held on the top part by means of a snap ring, whereas this is achieved in the second and third exemplary embodiment by means of a screw-connection, the assembly methods being interchangeable. This allows the locking elements to be exchanged, for example for other locking elements having a different coding. In a simpler embodiment it is also possible, however, to permanently connect the top part with the base part, for example by glueing, soldering, welding, or the like.

The number of locking elements in the exemplary embodiments is four or five. This is not mandatory, of course. Logically speaking, at least two locking elements must be provided, the number being upwardly limited by the available space.

In addition to the applications described within the framework of the exemplary embodiments, the inventive securing mechanism can be applied anywhere where openings need to be securely closed, or end regions of rod-shaped or other devices need to be secured by covering the closing part. As already described earlier, bolts and nuts of any type can be secured for any application. Additionally, bicycle axles, trailer hitches, shackle-type connectors and the like can be secured. Openings that are to be secured may be mini-safes according to the second exemplary embodiments that are installed as a key repository in vehicles or other facilities. Additional types of such securing mechanisms are steering wheel locks, bolt locks, ball valves, and the like. Elements of this type may be used for the plumbing of control equipment, electric meters, water meters, containers, transport safety devices, mines, or the like. An application as a vehicle immobilization lock or brake disc lock is possible as well.

The designs of the described exemplary embodiments and their individual components are also interchangeable. For instance, the first and third exemplary embodiment may also be designed with a radially outwardly oriented locking means for the securing of openings as well, whereas the second embodiment may be designed with a radially inwardly oriented locking means for securing of bolts or the like. Additionally, the dynamic effect of the springs may also act in the opposite direction in all exemplary embodiments, with the catching structure and catching element accordingly cooperating in the opposite direction, so that the inventive sensing protection takes effect in the case of pressure instead of a pulling motion.

What is claimed is:

1. A securing system comprising a securing mechanism and a device that is to be secured, the securing mechanism having a closing part and in which at least two locking elements are rotatably mounted that are designed for an engagement into an annular groove of the device that is to be secured, each of the locking elements having an engaging element to lock the device that is to be secured in any position of rotation of said each locking element except one position of rotation of said each locking element defined by a recess to allow unlocking, wherein an end region of each of the locking elements is accessible from outside the closing part to allow an adjusting member to engage therein, wherein a spring is assigned to each of the locking elements, wherein said spring presses the respective locking element in the direction of the axis of rotation thereof against a contact area of the closing part, and wherein a catching structure having a plurality of catching recesses is disposed on a surface of each of the respective locking elements, wherein an edge of the annular groove of the device that is to be secured forms a catching element, which engages into the catching recesses of the catching structure when the device that is to be secured is attached to the securing mechanism and the respective locking element is rotated at least when the closing part is tilted or axially displaced, wherein the spring acting upon the respective locking element presses the engaging element against an annular surface of the contact area of the closing part, wherein a surface of the engaging element facing the contact area of the closing part is provided with the catching structure and wherein each of the catching recesses has a surface similar to the recess that allows the unlocking of the respective locking element but is only a few tenths of a millimeter deep.

2. The securing system according to claim 1, wherein the locking elements are designed as rotatably mounted pins, which are provided with a disc-shaped concentric engaging element for engaging into the annular groove of the device that is to be secured, wherein the engaging element in the specified position of rotation has a peripheral recess to avoid engagement with the device that is to be secured in this position of rotation of the locking element.

3. The securing system according to claim 1, wherein the adjusting member is provided with an adjusting dial.

4. The securing system according to claim 1, wherein the adjusting member is connectable to the closing part in a manner so that the adjusting member cannot be pulled off the closing part.

5. The securing system according to claim 1, wherein the closing part consists of at least two axially joinable individual elements each of which have support areas for the locking elements.

6. The securing system according to claim 1, wherein a face of the closing part that is provided with the access to the end regions of the locking elements is provided with a removable cap.

* * * * *